Sept. 7, 1954   J. R. OISHEI ET AL   2,688,514
WINDSHIELD CLEANING SYSTEM
Filed May 5, 1948

INVENTOR.
John R. Oishei & Anton Rappl
BY Bean, Brooks, Buckley & Bean.
ATTORNEYS.

Patented Sept. 7, 1954

2,688,514

UNITED STATES PATENT OFFICE 2,688,514

WINDSHIELD CLEANING SYSTEM

John R. Oishei, Buffalo, and Anton Rappl, Eggertsville, N. Y., assignors to Trico Products Corporation, Buffalo, N. Y.

Application May 5, 1948, Serial No. 25,206

5 Claims. (Cl. 299—58)

This invention relates to the windshield cleaning art and especially to an apparatus for washing the windshield free of vision obscuring matter. Devices of this nature now in use have required the motorist to hold the control valve open for an interval of time sufficient for the pump to take a full charge of the liquid solvent prior to delivery of the liquid onto the windshield. This detracts the attention somewhat from the driving of the vehicle.

The object of this invention is to accomplish the windshield washing with a minimum distraction and consequently provide a greater factor of safety in the maneuverability of the vehicle.

Furthermore, the invention has for its object to provide a windshield washer which will quickly respond, when a demand is made upon it, and will continue to function for a predetermined time interval in an automatic manner for effectively clearing the field of vision.

Again the invention has for its object to provide an improved means for effecting a prolonged delivery of fluid through a novel and unique arrangement.

Figure 1:
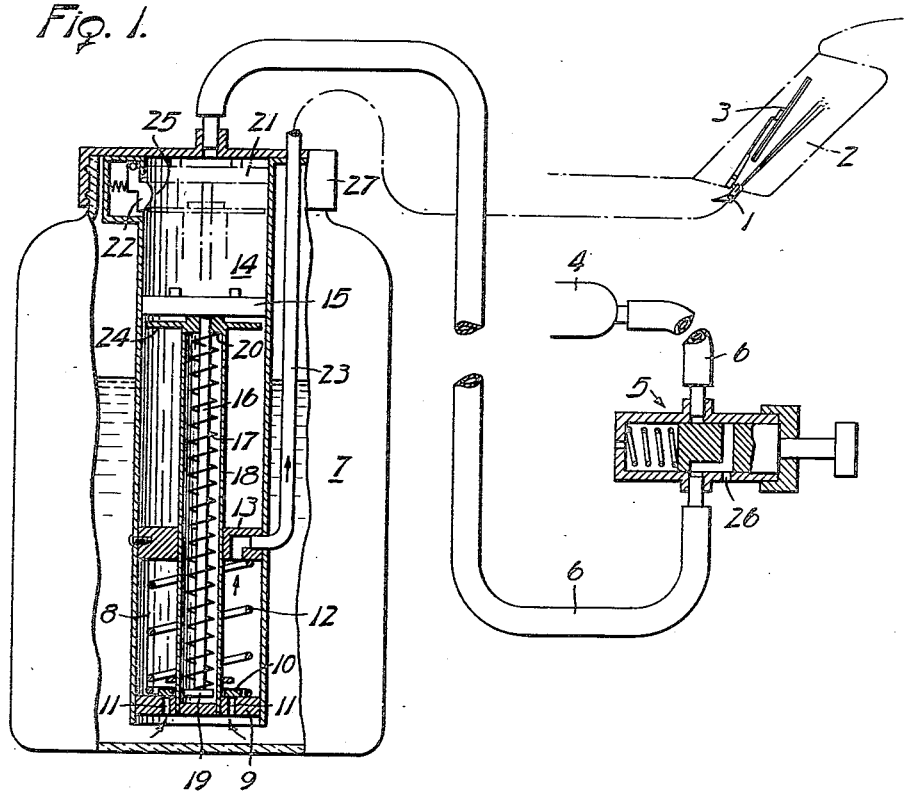
Figure 2:
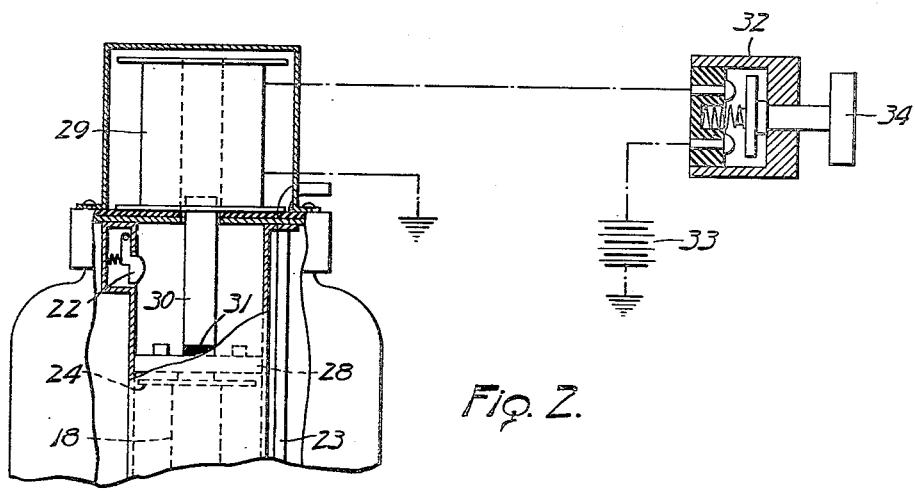

The foregoing and other objects of the invention will manifest themselves as this description progresses, reference being made to the accompanying drawing wherein Fig. 1 is a view generally schematic but showing the pumping apparatus and its control in section; and Fig. 2 is a like view, in fragment, of a modified embodiment.

Referring more particularly to the drawing, the numeral 1 designates the delivery nozzle, 2 the windshield, 3 the wiper and its actuating arm, 4 the intake manifold, and 5 the control valve which is operable to open the suction line 6 from the manifold to the pump.

The pump is interposed between the delivery nozzle 1 and a liquid containing reservoir 7 and has a chamber 8 in which reciprocates a fluid displacing member 9. The chamber 8 may be opened at its lower end and the displacing member or piston 9 ported to admit liquid by gravity into the chamber, a loose valve 10 serving to close the ports 11 on the delivery stroke. A spring 12 is interposed between the piston and the chamber head 13 to move the former on its downward or intaking stroke and normally hold the piston in its lowermost position.

A motor is employed to actuate the pump when called for. The motor depicted in Fig. 1 is of the fluid pressure type and has a chamber 14 and a piston 15 the latter being movably connected to the displacing member 9 for relative movement, as by a rod 16. A spring 17 connects the rod to the displacing member. In the illustrated embodiment, this connection is facilitated by providing the displacing member with a tubular stem 18 to receive the rod 16 and to house the spring 17 which latter is coiled about the rod to react between a shoulder 19 on the free end of the rod and an internal shoulder 20 in the stem.

It will therefore be apparent that when an operating fluid pressure differential is applied to the motor piston the latter will respond immediately and move to its uppermost position, indicated by the broken lines 21, where it may be momentarily held by a spring projected latch or detent 22 to permit the motorist releasing the control button valve 5. This quick responsive movement of the motor piston will initially compress the coil spring 17 to store up energy therein for subsequent expenditure in lifting the pump piston 9 on its delivery stroke against the urge of its spring 12. The spring imparted delivery stroke will follow the release of the manual valve 5 until the liquid content of the pump chamber has been displaced through the delivery pipe 23 and the connected nozzle 1. The motor piston therefore constitutes a means for energizing the spring 17 to actuate the pump on its delivery stroke, and as the tubular stem 18 telescopes over the connecting rod 16 a trip plate 24 will ride upon the cam face 25 of the latch to release the energizing member 15 whereupon the spring 12 will depress the unit 9, 15, for intaking a fresh charge of the cleansing solution.

The moment the motorist releases his hold on the control valve 5 the motor chamber 14 will be vented to the atmosphere through the valve passage 26. However, before this venting can occur the spring energizing motor piston has moved into the grasp of the detent 22.

The motor chamber as well as the pump chamber may conveniently form parts of a tube, which is suspended from the cover 27 for the reservoir, and be partitioned one from the other by the head 13 through which the tubular stem passes with a sliding fit.

The modified showing of Fig. 2 operates the spring energizing member 28 through an electric motor, as by an electro-magnet or solenoid 29, the armature 30 being joined through a connector 31 of insulation. By closing the switch 32, in circuit with the solenoid and the source of energy 33, the energizing member 28 will be attracted up into engagement with the latch or detent 22 where it will be retained to render the spring 17 operative after the release of the switch button 34 and until the trip member 24 frees the unit 9, 28, for descent under the urge of spring 12, all in a manner similar to that set forth in the fluid pressure embodiment of Fig. 1.

The washer is efficient and requires but a minimum of attention from the motorist. The quantity of solvent delivered onto the windshield in the path of the wiper will be uniform and will continue in its flow until the full displacement has been completed. The spring energizing or conditioning member 15 (28), serves to increase the urge of spring 17 from a degree in which it is subservient to the spring 12 to one in which it dominates the spring 12. In the normal inoperative position of the pump the spring 12 dominates the spring 17 so as to maintain the pump piston in its lowermost position. The inventive teachings herein disclosed are capable of assuming other physical embodiments without departing from the spirit of the invention and the scope of the appended claims, the detailed description above being given for ease of understanding and not by way of limitation.

What is claimed is:

1. In a washer for the windshields of motor vehicles, a pump having a chamber with an inlet and an outlet, a displacing member operable in the chamber on one stroke to displace liquid therefrom and having a return stroke for intaking liquid, a spring compressible on one stroke of said member for subsequent use in effecting its other stroke, a motor, a resilient power transmitting connection between the motor and the displacing member normally dominated by the spring but capable of being biased by the motor to dominate the spring and store up sufficient energy in the resilient connection to actuate the displacing member on its said one stroke, a detent operable to hold the resilient connection in its energy stored position for the duration of said other stroke, a trip member movable by the connection-energized displacing member to render the detent inoperative for releasing the displacing member for its spring-returned stroke, and a control operable to so actuate the motor.

2. In a windshield washer, a pump having a displacing member with an ejecting stroke and an intaking stroke, a spring normally acting on the member to effect the intaking stroke, a second spring connected to the member for actuating it on its ejecting stroke but normally dominated by the first spring, a suction responsive member operable to bias the second spring in counteraction of the first spring to dominate the latter for actuating said displacing member on such ejecting stroke, holding means operable to secure the suction responsive member in such counteracting position to maintain the ejecting stroke, and means operable by the displacing member on its ejecting stroke to render the holding means inoperative to enable the first spring so functioning.

3. In a windshield washer having a spray nozzle and a reservoir, a pump for connection to the nozzle and reservoir and having a displacing member operable on one stroke to eject liquid and on a return stroke to intake liquid, a spring acting on the displacing member normally to move it on its intake stroke, a power actuating member operable to move the displacing member on its ejecting stroke, resilient means connecting the actuating member to the displacing member and normally permitting the spring to so move said displacing member but energizable by the actuating member to counteract said spring and thereafter to move the displacing member on its ejecting stroke, latch means operable to hold the actuating member in its energizing position, and release means movable by the displacing member at the end of its ejecting stroke to render the latch means inoperative to release the displacing member for its intake stroke under the action of the spring.

4. A windshield washer having a liquid reservoir, a spray nozzle, and an interposed pump unit having a chamber with an inlet from the reservoir and an outlet to the nozzle, a fluid displacing member operable in the chamber to eject fluid on one stroke and to intake fluid on the return stroke, a spring acting on the displacing member normally to move it on its intake stroke, in combination with a motor unit and a manual control therefor, a resilient connection between the motor unit and the displacing member normally permitting said spring to function but adapted to be biased by said motor unit in counteraction of said spring to yieldably move the displacing member on its ejecting stroke, retaining means operable to hold the motor unit in its connection biased position for the completion of the ejecting stroke, and a release part movable by said displacing member at the end of its ejecting stroke to render the retaining means inoperative to free said spring for effecting the intake stroke.

5. In a windshield washer, a motor chamber and a pump chamber in axial alinement, a piston slidable in the motor chamber and having an axial rod, a plunger in the pump chamber also having a rod, the two rods slidable one upon the other, a spring connecting the two rods and yieldably holding the piston and plunger for movement as a unit during one stroke of the pump, a second spring normally dominating the first spring and acting to so move the unit, means operable to actuate the piston on its return stroke and against the action of the first spring to bias it to a dominating position relative to the second spring for causing the first spring to impart the reverse stroke to the plunger, retention means operable to hold the piston arrested at the end of its return stroke for the duration of the reverse stroke of the plunger, and means movable with the plunger to render the retention means inoperative for releasing the unit to be moved by the second spring.

References Cited in the file of this patent

UNITED STATES PATENTS

| Number | Name | Date |
| --- | --- | --- |
| 1,723,909 | Alvey | Aug. 6, 1929 |
| 1,911,474 | Smith | May 30, 1933 |
| 2,114,558 | Dismukes | Apr. 19, 1938 |
| 2,153,519 | Horton | Apr. 4, 1939 |
| 2,289,650 | Horton | July 14, 1942 |